(12) United States Patent
Gerhardt et al.

(10) Patent No.: US 10,866,218 B2
(45) Date of Patent: Dec. 15, 2020

(54) MANAGING FLUIDIC CONNECTIONS TO MICROFLUIDIC DEVICES

(71) Applicant: Waters Technologies Corporation, Milford, MA (US)

(72) Inventors: Geoff C. Gerhardt, Woonsocket, RI (US); Keith Fadgen, Hope Valley, RI (US); Joseph D. Michienzi, Plainville, MA (US); Bernard Bunner, Newton, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

(21) Appl. No.: 16/382,083

(22) Filed: Apr. 11, 2019

(65) Prior Publication Data

US 2019/0234915 A1  Aug. 1, 2019

Related U.S. Application Data

(63) Continuation of application No. 14/372,829, filed as application No. PCT/US2013/023771 on Jan. 30, 2013, now abandoned.

(Continued)

(51) Int. Cl.
*G01N 30/38* (2006.01)
*G01N 30/20* (2006.01)
(Continued)

(52) U.S. Cl.
CPC ........ *G01N 30/38* (2013.01); *B01L 3/502715* (2013.01); *B01L 3/502738* (2013.01);
(Continued)

(58) Field of Classification Search
None
See application file for complete search history.

(56) References Cited

U.S. PATENT DOCUMENTS 5,360,320 A  11/1994  Jameson et al.
6,290,909 B1  9/2001  Paul et al.
(Continued)

FOREIGN PATENT DOCUMENTS

JP  0590067 U  12/1993
JP  2002174628 A  6/2002
(Continued)

OTHER PUBLICATIONS

Restriction/Election Requirement in U.S. Appl. No. 14/372,829, dated Feb. 9, 2017; 9 pages.
(Continued)

*Primary Examiner* — Kara M Peo
(74) *Attorney, Agent, or Firm* — Schmeiser, Olsen & Watts LLP (57) ABSTRACT

A method may include reducing fluid flow between a rotor and a microfluidic device. The method may further include reducing a sealing force between the rotor and the microfluidic device. The method may also include rotating the rotor relative to the microfluidic device, at the reduced sealing force, to change a fluid pathway therebetween. The method may additionally include reestablishing the sealing force to produce a fluid tight seal between the rotor and the microfluidic device. Moreover, the method may include reestablishing the fluid flow between the rotor and the microfluidic device.

20 Claims, 11 Drawing Sheets

Related U.S. Application Data (60) Provisional application No. 61/593,525, filed on Feb. 1, 2012.

(51) Int. Cl.
| | | |
|---|---|---|
| *F04D 15/00* | (2006.01) | |
| *F04D 29/08* | (2006.01) | |
| *F16K 99/00* | (2006.01) | |
| *B01L 3/00* | (2006.01) | |

(52) U.S. Cl.
CPC .............. *B01L 3/567* (2013.01); *F04D 15/00* (2013.01); *F04D 29/086* (2013.01); *F16K 99/0013* (2013.01); *G01N 30/20* (2013.01); *B01L 2200/0689* (2013.01); *B01L 2400/0622* (2013.01); *B01L 2400/0644* (2013.01); *G01N 2030/202* (2013.01)

(56) References Cited

U.S. PATENT DOCUMENTS

| | | |
|---|---|---|
| 6,537,451 B1 | 3/2003 | Hotier |
| 6,635,226 B1 | 10/2003 | Tso et al. |
| 6,702,256 B2 | 3/2004 | Killeen et al. |
| 7,138,062 B2 | 11/2006 | Yin et al. |
| 7,159,848 B2 | 1/2007 | Brennen |
| 7,462,280 B2 | 12/2008 | Goodley |
| 7,744,762 B2 | 6/2010 | Lazar |
| 7,811,452 B2 | 10/2010 | Yin et al. |
| 7,871,575 B2 | 1/2011 | Baeuerle et al. |
| 7,927,550 B2 | 4/2011 | Baeuerle et al. |
| 8,071,052 B2 | 12/2011 | Baeuerle et al. |
| 2004/0134546 A1 | 7/2004 | Schick et al. |
| 2006/0260695 A1* | 11/2006 | Keene .................... F16K 11/07 137/554 |
| 2007/0017869 A1 | 1/2007 | Goodley |
| 2007/0025887 A1* | 2/2007 | Baeuerle ............ G01N 35/0099 422/400 |
| 2009/0205409 A1* | 8/2009 | Ciavarini ................ G01N 30/34 73/61.56 |
| 2009/0321356 A1* | 12/2009 | Gerhardt ............. G01N 30/606 210/656 |
| 2010/0021883 A1 | 1/2010 | Sowerby et al. |
| 2010/0190146 A1 | 7/2010 | Bynum et al. |
| 2010/0276617 A1 | 11/2010 | Yasunaga |

FOREIGN PATENT DOCUMENTS

| | | |
|---|---|---|
| JP | 2007033442 A | 2/2007 |
| JP | 2007516394 A | 6/2007 |
| JP | 2009531665 A | 9/2009 |
| WO | 2005047826 A2 | 5/2005 |
| WO | 2008140374 A1 | 11/2008 |
| WO | 2009101695 A1 | 8/2009 |

OTHER PUBLICATIONS

Non-Final Office Action in U.S. Appl. No. 14/372,829, dated May 5, 2017; 21 pages.
Final Office Action in U.S. Appl. No. 14/372,829, dated Nov. 8, 2017; 23 pages.
Non-Final Office Action in U.S. Appl. No. 14/372,829, dated Sep. 12, 2018; 20 pages.
Final Office Action in U.S. Appl. No. 14/372,829, dated Jan. 11, 2019; 18 pages.
Advisory Action in U.S. Appl. No. 14/372,829, dated Mar. 13, 2019; 7 pages.
Extended European Search Report for European Application No. 13743375.1, dated Oct. 28, 2015; 8 pages.
International Search Report and Written Opinion for International Application No. PCT/US13/23771, dated Mar. 28, 2013; 9 pages.
International Preliminary Report on Patentability for International Application No. PCT/US13/23771, dated Aug. 14, 2014; 7 pages.

\* cited by examiner

MANAGING FLUIDIC CONNECTIONS TO MICROFLUIDIC DEVICES

RELATED APPLICATIONS

This application is a U.S. Continuation Application of and claims priority to and benefit of U.S. patent application Ser. No. 14/372,829 entitled "Managing Fluidic Connections to Microfluidic Devices," filed Jul. 17, 2014, which is the National Stage of International Application No. PCT/US2013/023771 entitled "Managing Fluidic Connections to Microfluidic Devices," filed Jan. 30, 2013, which claims priority to and benefit of U.S. Provisional Patent Application No. 61/593,525 entitled "Managing Fluidic Connections To Microfluidic Devices," filed Feb. 1, 2012. The contents and teachings of each of these applications are hereby expressly incorporated herein by reference in their entirety.

TECHNICAL FIELD

This disclosure generally relates to managing fluidic connections to microfluidic devices.

BACKGROUND

Within the field of capillary or nano-scale chromatography, e.g. high-performance liquid chromatography (HPLC), microfluidic devices have been used in place of traditional tubular columns made out of stainless steel, polyether-ether-ketone, or fused silica. Such microfluidic devices have advantages over traditional tubular columns, including the integration of major fluidic components or channels, e.g., trapping and analytical channels, on the same device with minimum dead volume therebetween, better ease of use, reduction of fluid connections and associated human errors, and reduced risk of leakage. In some cases, rotors have been incorporated to interface with such microfluidic devices to form rotary shear valves for controlling fluid paths. Such interfaces, in some cases, are provided with a fluid-tight seal, which can withstand high pressures, e.g., up to about 30,000 pounds per square inch (psi) or higher. Issues that are commonly associated with such interfaces include wear, particulate formation, leakage, and composition disturbances.

SUMMARY

The disclosure arises, in part, from the realization that a system (e.g., a chromatography system), and related method, having a microfluidic device, a rotor interfacing with the microfluidic device, a clamping mechanism, and a fluid delivery structure, can advantageously be configured to prevent issues commonly associated with the interface between the rotor and the microfluidic device, such as wear, particulate formation, leakage, and composition disturbances. Such configurations coordinate rotation of the rotor and operation of the clamping mechanism. Such configurations further coordinate fluid delivery structure with rotation of the rotor and operation of the clamping mechanism.

An aspect features a method that includes reducing fluid flow between a rotor and a microfluidic device; reducing a sealing force between the rotor and the microfluidic device; rotating the rotor relative to the microfluidic device, at the reduced sealing force, to change a fluid pathway therebetween; reestablishing the sealing force to produce a fluid tight seal between the rotor and the microfluidic device; and reestablishing the fluid flow between the rotor and the microfluidic device.

Implementations may include one or more of the following features.

In some implementations, the method may include coordinating the steps of reducing the fluid flow and reducing the sealing force between the rotor and the microfluidic device.

In some implementations, reducing fluid flow comprises reducing the flow to zero flow.

Another aspect features a method for controlling a chromatography system to prevent at least one of wear, particulate formation, leakage, and composition disturbance associated with an interface between a rotor and a microfluidic device that includes driving a linear actuator to push the microfluidic device into fluid tight contact with the rotor to create a sealing force at the interface between the rotor and the microfluidic device to prevent at least one of wear, particulate formation, leakage, and composition disturbance associated with the interface between the rotor and the microfluidic device; delivering a mobile phase into the microfluidic device; reducing flow of the mobile phase into the microfluidic device via a pump; releasing the sealing force at the interface between the rotor and the microfluidic device via the linear actuator; rotating the rotor relative to the microfluidic device; reestablishing the sealing force at the interface between the rotor and the microfluidic device via the linear actuator to prevent at least one of wear, particulate formation, leakage, and composition disturbance associated with the interface between the rotor and the microfluidic device; and resuming flow of the mobile phase into the microfluidic device via the pump wherein the mobile phase merges with a sample in the microfluidic device.

Implementations may include one or more of the following features.

In some implementations, the method may include injecting a sample into a channel of the microfluidic device.

In some implementations, the method may include aspirating a sample into the microfluidic device.

In some implementations, the sealing force is reduced during rotation of the rotor relative to the microfluidic device.

In some implementations, control electronics in signal communication with a rotor driver and the linear actuator control the driving of the linear actuator and the rotation of the rotor relative to the microfluidic device.

In some implementations, driving the linear actuator to push the microfluidic device into fluid tight contact with the rotor to create the sealing force at the interface between the rotor and the microfluidic device comprises displacing a fluidic manifold to push the microfluidic device into fluid tight contact with the rotor wherein the microfluidic device is positioned between the fluidic manifold and the rotor.

In some implementations, reducing flow of the mobile phase into the microfluidic device via the pump comprises reducing the flow to zero flow.

In some implementations, the rotor comprises a polymeric material, wherein the polymeric material defines a surface facing the microfluidic device.

In some implementations, the polymeric material comprises polyetheretherketone, polyimide, or mixtures thereof.

In some implementations, the surface is an unpolished surface.

In some implementations, the linear actuator is coupled with the rotor.

In some implementations, the linear actuator is a mechanical, electric, magnetic, hydraulic, or pneumatic actuator, or any combination thereof.

In some implementations, the electric actuator is a piezoelectric actuator.

In some implementations, the sealing force established by the linear actuator is fluid tight up to about 30,000 psi or higher.

In some implementations, the sealing force is reduced to a lower level of 0 psi to 5000 psi prior to rotation of the rotor and maintained at the lower level during rotation of the rotor.

Another aspect features a method for controlling a chromatography system to prevent at least one of wear, particulate formation, leakage, and composition disturbance associated with an interface between a rotor and a microfluidic device that includes driving a linear actuator to push the microfluidic device into fluid tight contact with the rotor to create a sealing force at the interface between the rotor and the microfluidic device to prevent at least one of wear, particulate formation, leakage, and composition disturbance associated with the interface between a rotor and a microfluidic device; and reducing the sealing force during rotation of the rotor relative to the microfluidic device.

Implementations may include one or more of the following features.

In some implementations, the method may include reestablishing the sealing force at the interface between the rotor and the microfluidic device via the linear actuator to prevent at least one of wear, particulate formation, leakage, and composition disturbance associated with the interface between a rotor and a microfluidic device.

As used herein, all numbers may be read as if prefaced by the term "about," even if the term does not expressly appear. Also, any numerical range recited herein is intended to include all sub-ranges subsumed therein.

The term "sample," as used herein, in the broadest sense, refers to compositions of matter for which further information is desired. By way of example, without limitation, the term is used to denote a compound or compounds, which may be of interest as to its or their presence, absence, concentration, or form.

The term "port," as used herein, refers to either an inlet port or an outlet port, e.g., an output port of a pump, an input port of a column, a sample injector port, a port of a valve, or a port of a mixing tee.

The term "signal communication," as used herein, refers to wired, as in electrical signals, or wireless, as in electromagnetic, radio, optical, or infrared transmission devices. The term "control electronics," as used herein, refers to commonly used computer type controls in the nature of computer processing units (CPUs), such as personal computing devices, servers, mainframe computers and the like known in the art.

The term "capillary," as used herein, refers to conduits having an inner diameter of no greater than about 300 μm. The term "nano-scale," as used herein, refers to conduits having an inner diameter of no greater than about 100 μm. Depending on context, the words "conduits", "column" and "channels" are used interchangeably herein.

Other aspects, features, and advantages are in the description, drawings, and claims.

BRIEF DESCRIPTION OF THE DRAWINGS

In the drawings, same or like reference characters and numbers generally refer to same or like elements throughout different views. Also, the drawings are not necessarily to scale.

DETAILED DESCRIPTION

Some implementations will now be described with respect to FIGS. 1-9. Such implementations are capable of modification and alteration without departing from the teaching of the present disclosure.

System Overview

Figure 1:
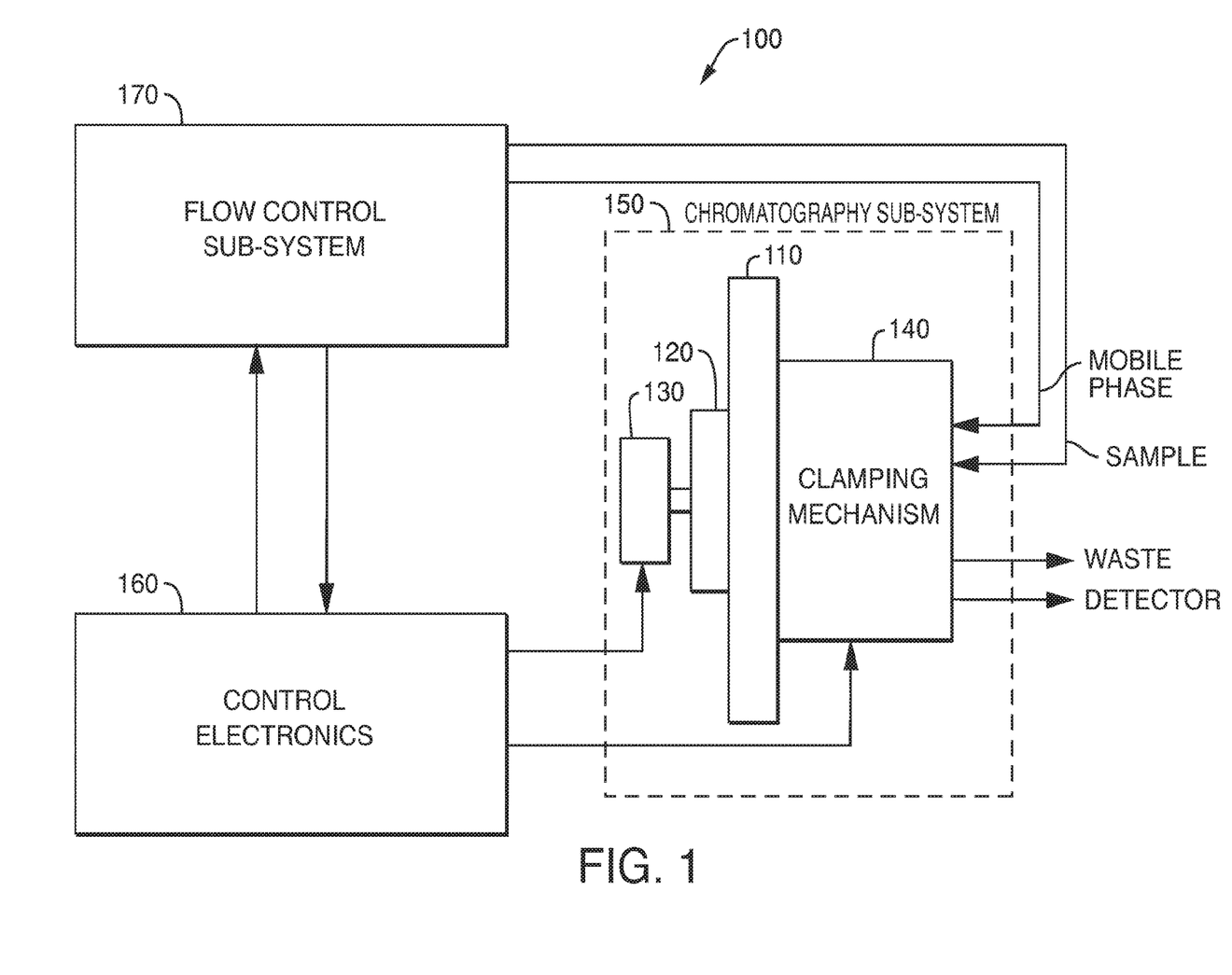
FIG. 1 is a schematic overview of a chromatography system.

Referring to FIG. 1, a chromatography system 100 (e.g., a capillary or nanoscale liquid chromatography system) includes a chromatographic sub-system 150, a flow-control sub-system 170, and control electronics 160 for controlling both of the sub-systems. The chromatographic sub-system 150 is configured to perform chromatography on a sample. The flow control subsystem 170 is configured to deliver fluid to the chromatographic sub-system 150, e.g., a mobile phase solvent for chromatographic separation or a wash reagent for carrying and purifying a sample.

The chromatographic sub-system 150 includes a microfluidic device 110, a rotor 120, a rotor driver 130, and a clamping mechanism 140. The microfluidic device 110 can be constructed to perform basic chromatographic work, such as trapping a sample of interest, shunting away unwanted interferences, and separating a sample into its constituent parts.

Different chromatographic work can be carried out through different fluidic passageways, which can be formed by displacing the rotor 120, in different angular positions, relative to the microfluidic device 110. In this regard, the rotor driver 130, e.g., a rotary actuator, is coupled to the rotor 120 and is configured to rotate the rotor 120 between different angular positions. The rotor driver 130 is in signal communication with the control electronics 160 and responds to one or more signals sent by the control electronics 160 as to when and in which direction to rotate the rotor 120.

The control electronics 160 can be commonly used computer type controls in the nature of computer processing units (CPUs), such as personal computing devices, servers, mainframe computers and the like known in the art. The control electronics 160 can have a single CPU or multiple CPUs.

The clamping mechanism 140, controlled by the control electronics 160, applies a sealing force to the microfluidic device 110 to move the microfluidic device 110 into direct contact with the rotor 120 such that the microfluidic device 110 is clamped between the rotor 120 and the clamping mechanism 140, thereby forming a fluid-tight seal between the rotor 120 and the microfluidic device 110. The clamping mechanism 140 provides a seal at an interface between the microfluidic device 110 and the rotor 120 that is fluid tight up to about 30,000 psi or higher. Such high pressure sealing can be beneficial for capillary or nano-scale liquid chromatography (LC), where any leakage can be severely detrimental to the system performance.

If the fluid-tight seal is maintained during rotation of the rotor 120, it can cause wearing of the surfaces involved in the interface and hence shorten the lifetime of the interface components. One way to promote longevity of the interface components is to have the surfaces highly polished, but this can be very costly. In some cases, compliant materials, such as polymeric materials, can be used at one or more surfaces at the interface, e.g., a layer of compliant material on the rotor 120, to provide good sealing. However, these materials, while good at complying with the microfluidic device 110, can shed particles when subject to the shear force. In a liquid chromatography (LC) system of analytical scale, i.e., columns having an inner diameter of greater than about 2 mm, high-capacity filters can be used to trap the particles so as to prevent blockage in the fluidic passageways formed in the interface. Yet, in a capillary or nano-scale LC system, it can be difficult to design such a filter without introducing a significant dispersion volume that could seriously compromise the system performance.

To help inhibit wear and particle shedding, the control electronics 160 can instruct the clamping mechanism 140 to act on the microfluidic device 110 in such a way that, prior to and during rotation of the rotor 120, the sealing force at the interface can be reduced (e.g., completely relieved). In some implementations, the sealing force can be reduced to 0 psi to 5000 psi prior to and during rotation of the rotor 120. After the rotor 120 has been rotated to a next position, the control electronics 160 signals the clamping mechanism 140 to resume the sealing force and to reestablish the fluid-tight seal at the interface.

By coordinating operations of the rotor 120 and the clamping mechanism 140, the wear and shedding issues, associated with interfacing between the rotor 120 and the microfluidic device 110, can be reduced or avoided, without implementing any filters and highly polished or engineered surfaces at the interface.

In some cases, it may be beneficial to further coordinate fluid delivery with operation of the clamping mechanism 140 and rotation of the rotor 120. In this regard, both the chromatography sub-system 150 and the flow-control sub-system 170 are controlled by the control electronics 160 such that, before sending commands to the rotor driver 130 to rotate the rotor 120 to a next position, the control electronics 160 first signals the flow-control sub-system 170 to reduce or stop any active flow running through the interface, and then signals the clamping mechanism 140 to release the sealing force at the interface. After the rotor 120 has been rotated to a next position, the control electronics 160 signals the clamping mechanism to resume the sealing force and to reestablish the seal between the rotor 120 and the microfluidic device 110. The control electronics 160 then feeds back the flow-control sub-system 170 to resume the flow. By further coordinating fluid delivery with operation of the clamping mechanism 140 and rotation of the rotor 120, the system 100 maintains the benefits of interfacing the rotor 120 to the microfluidic device 110 while avoiding (e.g., preventing) leakage and compositional disturbances, commonly associated with the interface.

The Microfluidic Device

Figure 2:
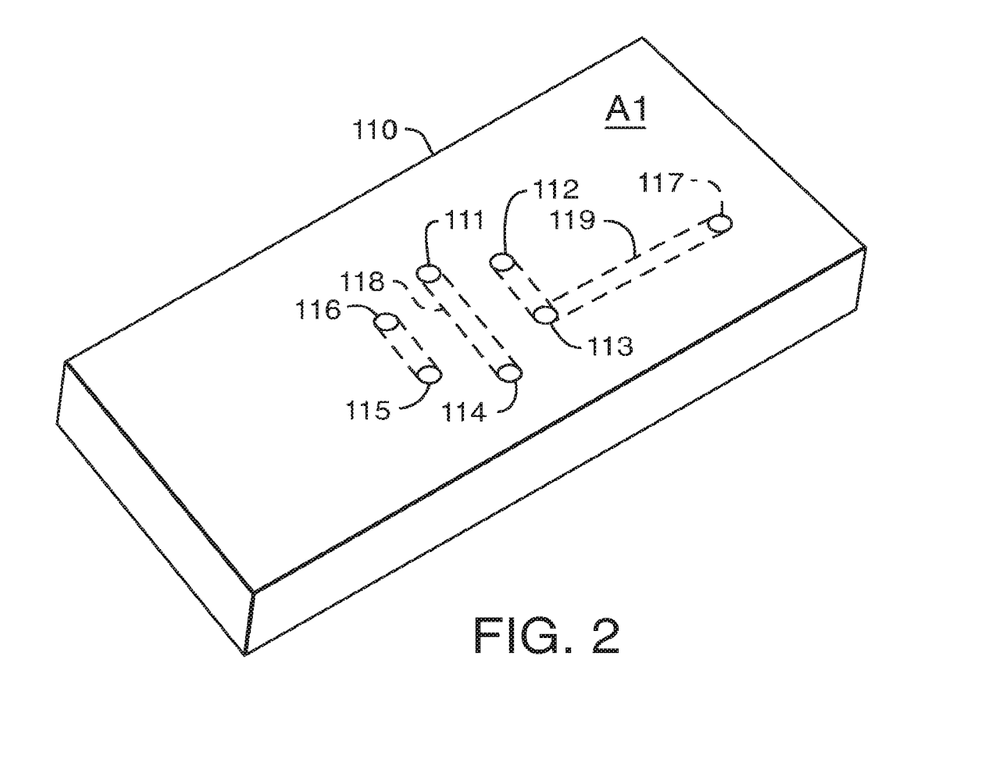
FIG. 2 is an isometric view of the microfluidic device, used in the system of FIG. 1.

FIG. 2 is an isometric view of the of the microfluidic device 110. The microfluidic device 110 has a plurality of channels and a first surface A1, which defines a plurality of fluid-conveying features in the form of fluidic ports 111-117, which are in fluid communication with the plurality of channels. In some implementations, the channels can include a sample loop and/or one or more chromatography columns, e.g., trap and/or analytical columns, for performing basic chromatographic work, such as trapping and/or separating a sample.

In the illustrated example, the plurality of channels, defined by the microfluidic device 110, includes a first channel 118 that serves as a sample loop, and a second channel 119 that serves as an analytical column or analytical channel. The second channel 119 can be packed with a separation medium, e.g., a bed of C18 beads, whereupon the sample can be separated into its constituent parts.

The analytical channel 119 can terminate at another port 117 on the second surface A2 of the microfluidic device 110 so that fluidic connection to a detector can be made via the fluidic interface. Alternatively, analytical channel 119 can extend out toward an outlet on a side/end surface of the microfluidic device 110, where it can be connected to a downstream detector.

The plurality of ports 111-117 include through-ports 112, 115, and 116, and blind ports 111, 113, 114, and 117. The through-ports 112, 115, and 116 extend all the way through the microfluidic device 110 from the first surface A1 to an opposite, second surface A2 (FIG. 3B). The blind ports 111, 113, and 114, extend from the first surface A1 and terminate at the channels 118 and 119. The blind port 117 extends from the second surface A2 (FIG. 3B) and terminates at channel 119.

In some cases, the microfluidic device 110 may consist essentially of a substrate that is formed of multiple substrate layers that are bonded together, such as by lamination, welding, or diffusion bonding. The substrate and/or the individual substrate layers can be formed of polyimide, ceramic, metal, or combinations thereof. Grooves and vias can be formed (e.g., by machining, chemical etching, or laser ablation) in the substrate layers such that, when combined together to form the substrate, the grooves are enclosed to form the channels 118, 119 and the vias form the ports 111-116, which can provide for fluid communication through the substrate and/or with the channels. Channel 119 can be packed with media (e.g., hydrophobic media or chromatographic particles) and frits can be formed at the ends of the channel to lock the packed media in place.

The Rotor

Figure 3A:
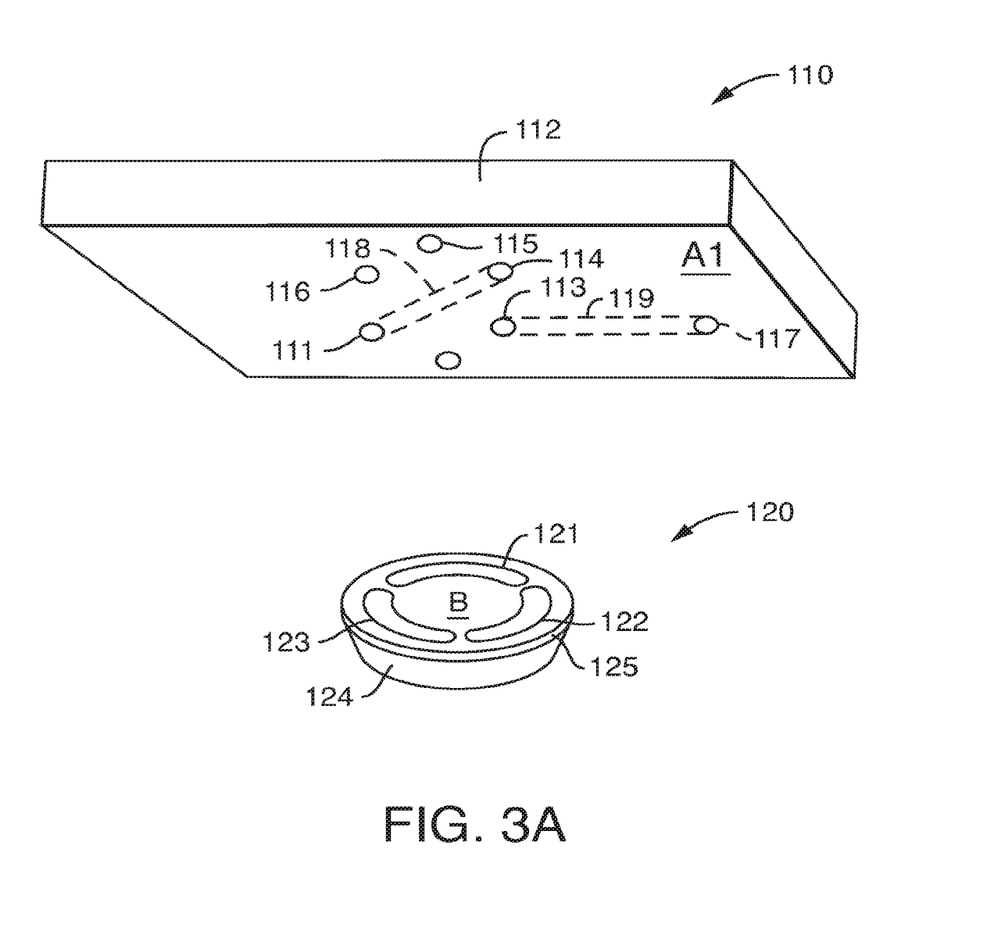
FIGS. 3A and 3B are exploded views of a rotor facing the lower and upper surfaces of the microfluidic device of FIG. 2.
Figure 3B:
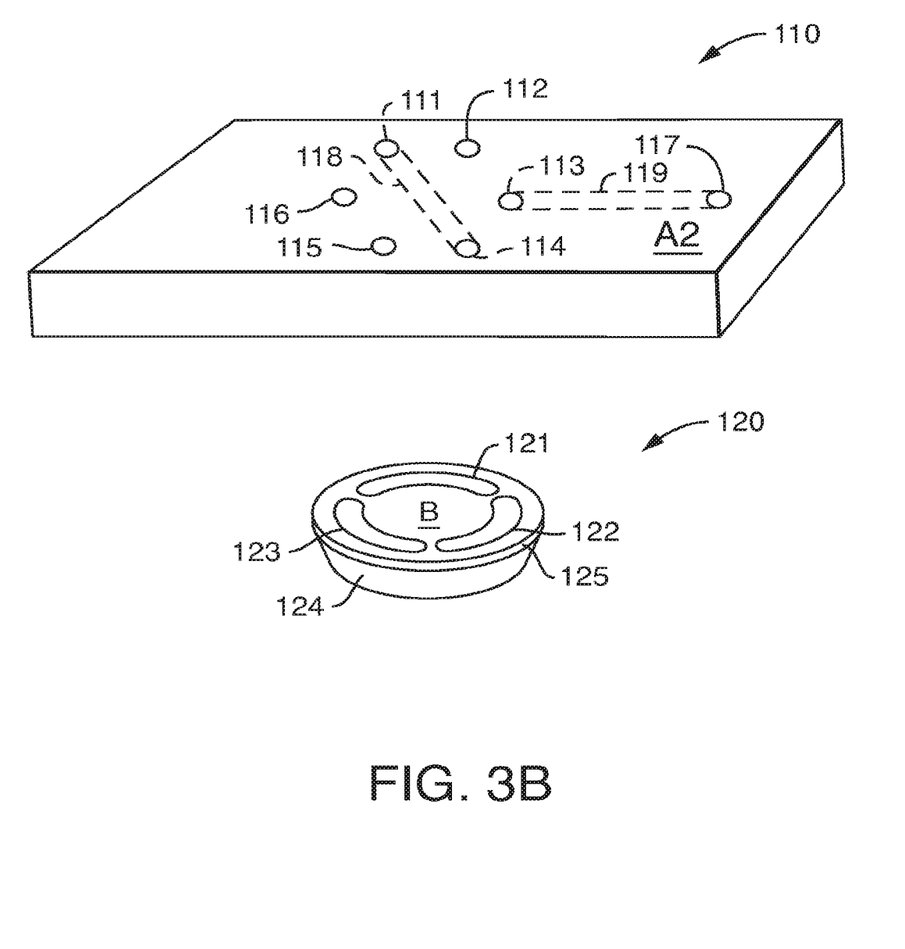

FIG. 3A illustrates the rotor 120 having a surface B facing the first surface A1 of the microfluidic device 110, and the microfluidic device 110, in this illustrated example, is used to perform basic chromatographic work. The rotor 120 includes a plurality of fluid-conveying features, which, in the implementation of FIG. 3, are three grooves 121-123, which can be formed in the surface B, e.g., by etching or machining. The grooves 121-123 function as fluidic conduits when cooperating with the fluidic ports 111-116 of the microfluidic device 110. When the two surfaces B and A1 come into direct contact, depending on which position the rotor 120 is in, the grooves 121-123 selectively connect three pairs of the fluidic ports 111-116 to form three fluid passageways between the fluidic ports. By rotating the rotor 120 to a next position, the grooves 121-123 overlap with three different pairs of the fluidic ports 111-116, thereby forming three different fluidic passageways therebetween. The depth of the grooves 121-123 is about 200 um.

In some cases, the rotor 120 can include a rotor body 124 and a layer of compliant material 125 that is disposed on the rotor body 124 and forms the surface B. The layer of compliant material 125 can have a thickness in a range of about 1.0 um to about 3.0 um. The rotor body 124 can be constructed from metallic or ceramic materials and the layer of compliant material 125 can be a coating of compliant polymer, such as PEEK polymer, available from Victrex PLC, Lancashire, United Kingdom, and VESPEL polymer, from Dupont Corporation, Delaware, USA, or mixtures thereof.

FIG. 3B is a view from the second surface A2 of the microfluidic device 110 of FIG. 3A, with the rotor 120 facing the first surface A1 of the microfluidic device 110. As shown in FIB. 3B, the through-ports 112, 115, and 116 extend through the microfluidic device 110 and allow for fluidic connections to be made at the second surface A2.

Figure 4A:
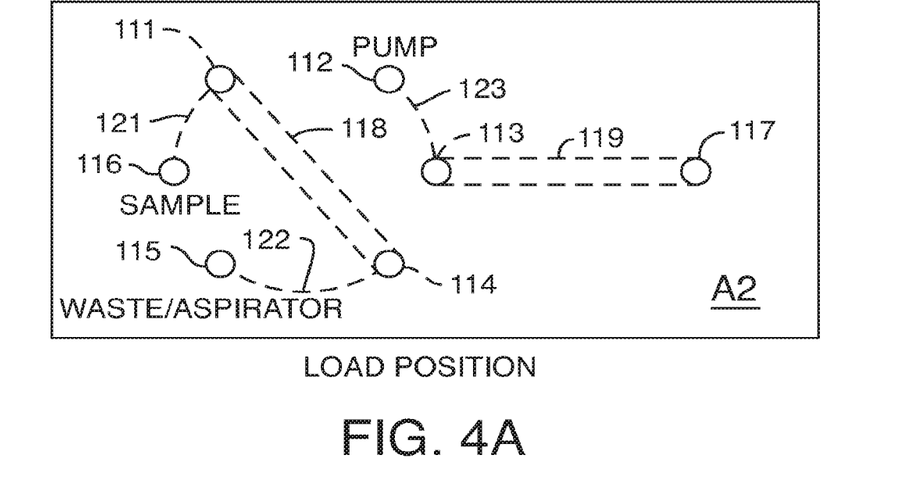
FIGS. 4A and 4B are plan views of the upper surface of the microfluidic device of FIG. 2, with the rotor abutting against the lower surface of the microfluidic device.
Figure 4B:
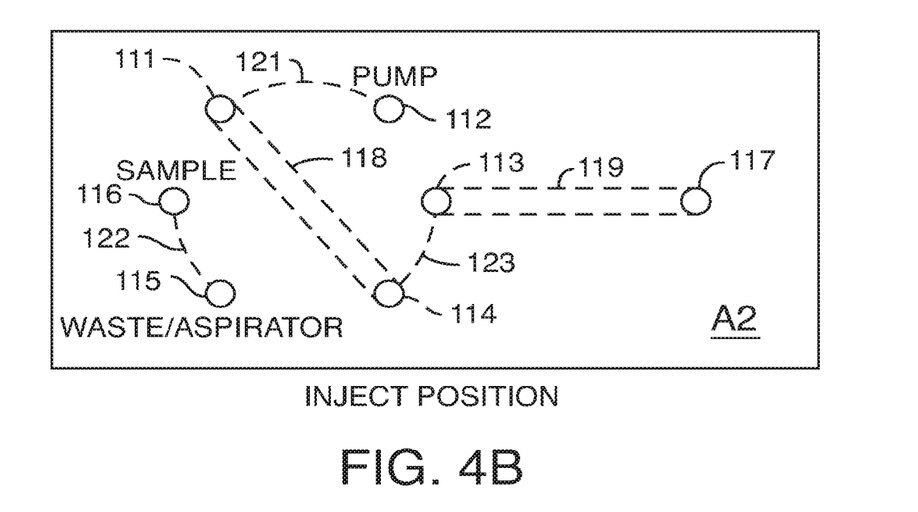

The rotor 120 can be rotated, relative to the microfluidic device 110, between a LOAD position (FIG. 4A) and an INJECT position (FIG. 4B). As illustrated in FIG. 4A, when the rotor 120 is in the LOAD position, the grooves 121-123 cooperate, respectively, with three pairs of the fluidic ports: 112/113, 114/115 and 111/116 of the microfluidic device 110, thereby forming three fluidic passageways therebetween. Generally, in the LOAD position, a sample fluid potentially carrying one or more analytes of interest delivered from a sample source, enters the microfluidic device 110 through the port 116, traverses the groove 121, and arrives at the channel 118 acting as a sample loop. In this regard, the sample may be injected into the channel 118 via a syringe connected to port 116, with excess being delivered to waste via port 115. Alternatively, the sample may be aspirated from the sample source through the action of an aspirator (e.g., a syringe) in communication with port 115. Meanwhile, mobile phase of desired solvent composition is delivered into the microfluidic device 110 via port 112 and then toward the channel 119 serving as a chromatography column.

In the INJECT position, illustrated in FIG. 4B, the grooves 121-123 are oriented to link three different pairs of the fluidic ports: 111/112, 113/114 and 115/116, thus forming three different fluid passageways therebetween. Generally, in the INJECT position, the mobile phase of desired solvent composition pumped from one or more pumps, e.g., nano pumps or a nano binary solvent manager (BSM), enters the microfluidic device 110 through the port 112, traverses the groove 121, and arrives at the channel 118. The mobile phase merges with the sample retained in the channel 118 and carries the sample away toward the analytical channel 119, whereupon the sample is separated into its constituent parts. The column effluent then exits the microfluidic device 110 and flows, e.g., to a detector, such as a mass spectrometer, for further analysis.

The Clamping Mechanism

Figure 5:
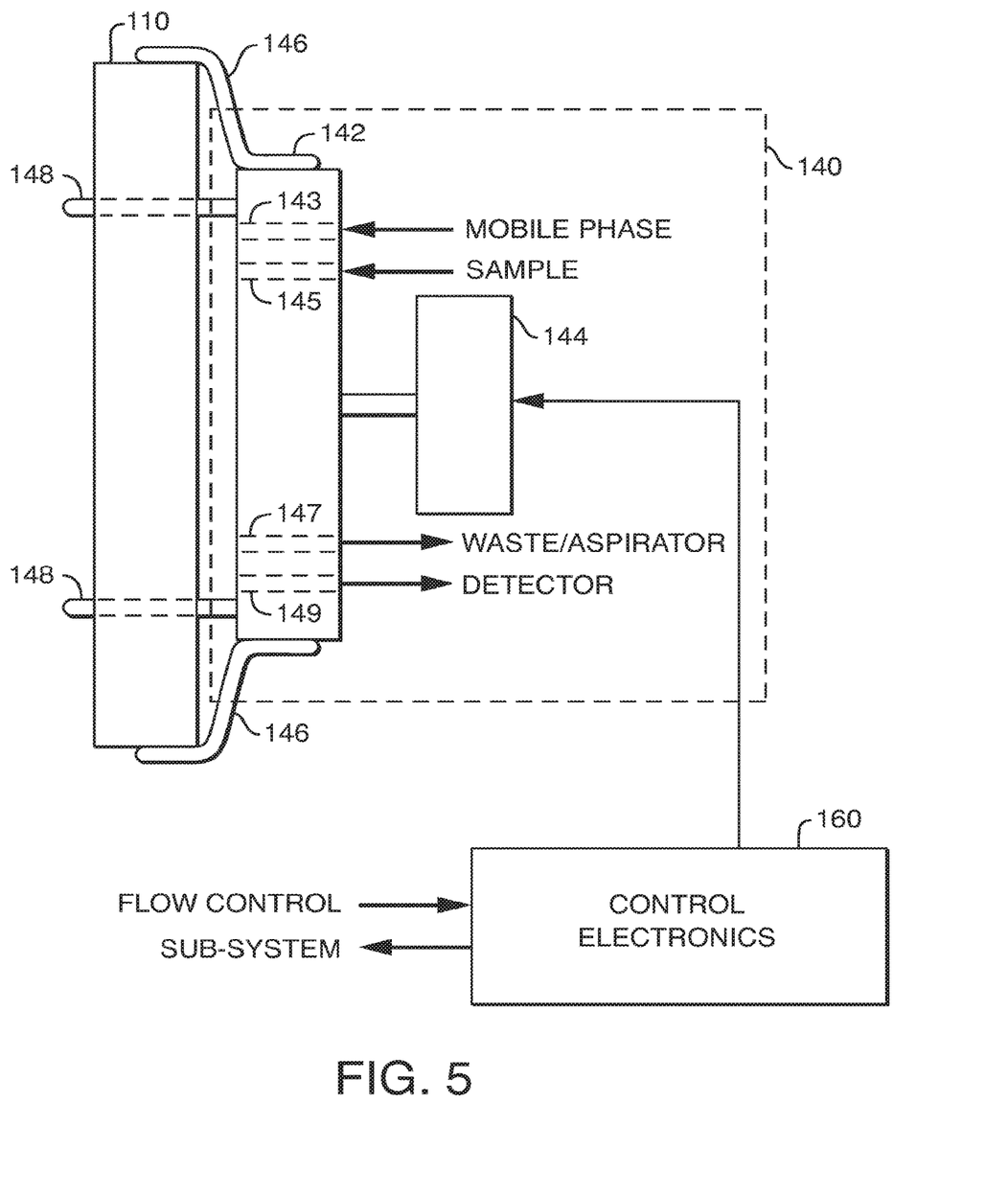
FIG. 5 is a side view of the clamping mechanism, implemented in the system of FIG. 1.

Referring next to FIG. 5, the clamping mechanism 140 includes a fluidic manifold 142 and a linear actuator 144, which is attached to the fluidic manifold 142. The clamping mechanism 140, controlled by the control electronics 160, applies a sealing force to the second surface A2 of the microfluidic device 110 to move the microfluidic device 110 into contact with the surface B of the rotor 120 such that the microfluidic device 110 is clamped between the rotor 120 and the fluidic manifold 142. The linear actuator 144 can be a mechanical (e.g., a piston or cam driven actuator), electric (e.g., piezoelectric actuator), magnetic, hydraulic, or pneumatic actuator, or any combination thereof. Accordingly, the force applied by the clamping mechanism 140 can be a mechanical force, an electromotive force, an electromagnetic force, and/or any other suitable types of forces. The clamping mechanism 140 provides a seal at the interface, which can be fluid tight up to about 30,000 psi or higher.

As shown in FIG. 5, the fluidic manifold 142 has a plurality of channels 143, 145, 147, 149, extending through the fluidic manifold 142, which permit fluidic connections between ports 112, 115, 116, and 117 of the microfluidic device 110 and external fluidic components, such as pumps, valves, fittings, columns, mixers, injectors and/or the like.

In some cases, the clamping mechanism 140 can be configured to support the microfluidic device 110 such that the microfluidic device 110 moves with the clamping mechanism 140. For example, the fluidic manifold 142 may include spring clips 146 for holding the microfluidic device.

In some example, the fluidic manifold 142 may, alternatively or additionally, include alignment pins 148, which can mate with alignment holes (not shown) in the microfluidic device 110. The use of alignment pins 148 can assist with aligning the fluidic ports 112, 115, and 166 of the microfluidic device 110 with the channels 143, 145, 147, 149 of the fluidic manifold 142, and can also help to support microfluidic device 110.

The Flow-Control Sub-System

Figure 6:
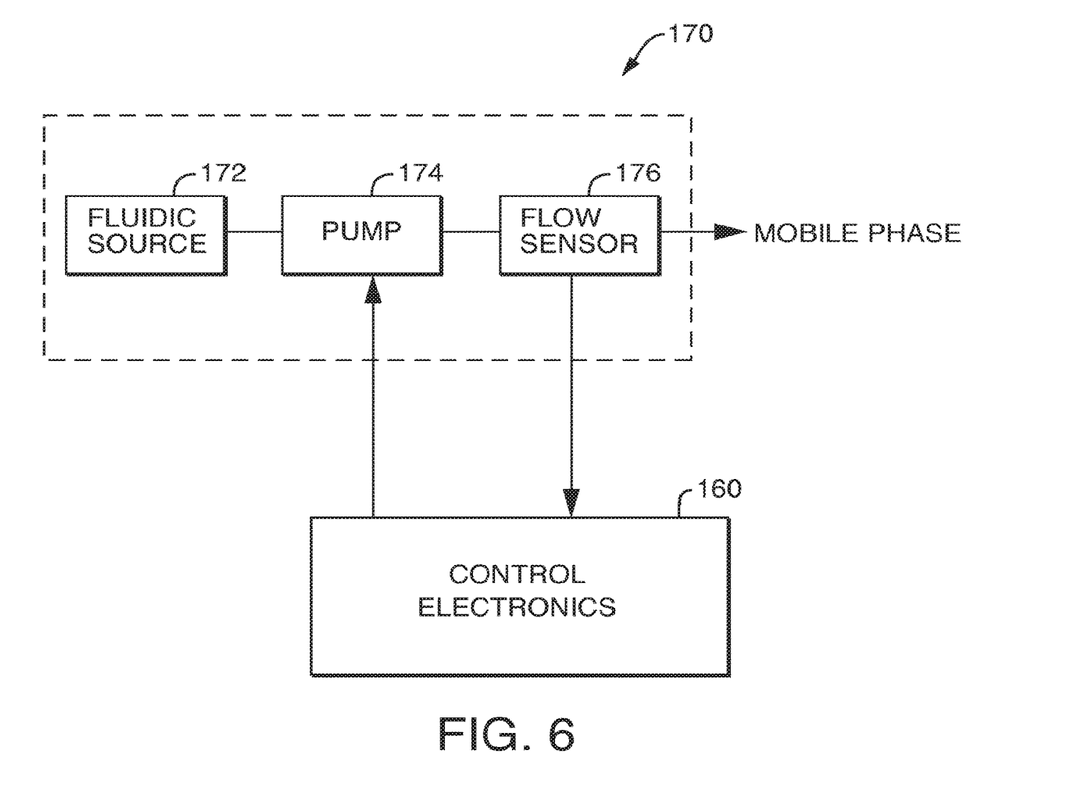
FIG. 6 is a side view of the flow-control sub-system, used in the system of FIG. 1.

FIG. 6 illustrates the flow-control sub-system 170. The flow-control sub-system 170 includes a fluid source 172 for supplying fluid, e.g., a mobile phase for sample separation; a pump 174, e.g., a nano pump or a nano BSM, in fluid communication with the fluid source 172, for pumping the fluid to the chromatographic sub-system 150; and a flow sensor 176 operatively coupled to the pump 174, for sensing the flow rate of the fluid from the pump 174 and sending signals to the control electronics 160. The control electronics 160, in response to the signals sent from the flow sensor 176, coordinates operations of the rotor 120 (FIG. 1), included in the chromatographic sub-system 150, and the pumps 174 and 175.

Methods of Use

Figure 7:
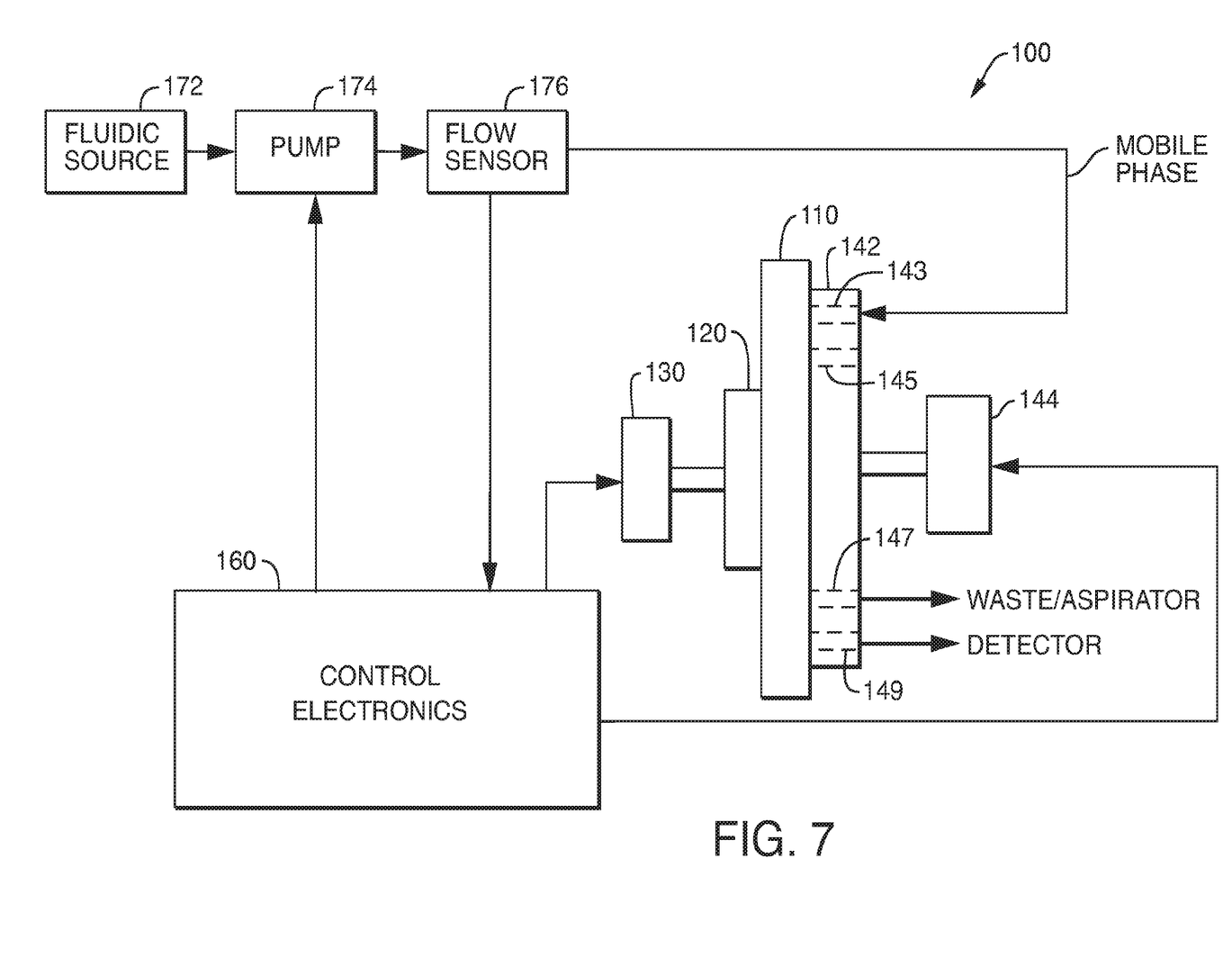
FIG. 7 is a schematic view of a system, including one flow-control sub-system.

In use, the microfluidic device 110 is positioned between the fluidic manifold 142 of the clamping mechanism 140 and the rotor 120, as shown in FIG. 7. The microfluidic device 110 is then urged into fluid tight contact with the rotor 120. More specifically, the control electronics 160 drive the linear actuator 144 which displaces the fluidic manifold 142, which, in turn, pushes the microfluidic device 110 into fluid tight contact with the rotor 120.

Initially, the rotor 120 is in the LOAD position, relative to the microfluidic device 110. In this LOAD position, the sample flows into the microfluidic device 110 via passageway 145 and then into the channel 118 (via fluidic communication between port 116, groove 121, and port 111). In this regard, the sample may be injected into the channel 118 via a syringe in communication with port 116 via passageway 145, with excess sample being delivered to waste via port 115 and passageway 147. Alternatively, the sample may be aspirated from the sample source through the action of an aspirator (e.g., a syringe assembly) in communication with port 115 via passageway 147. Meanwhile, mobile phase of desired solvent composition is delivered into the microfluidic device 110 via port 112 and then toward the channel 119 serving as a chromatography column.

The sample is retained in the channel 118 (FIG. 2), defined by the microfluidic device 110. Before the rotor 120 is switched to the INJECT position, the control electronics 160, in signal communication with the flow sensor 176, controls the pump 174 to reduce or stop the flowing mobile phase solvent. In some cases, the flow can be reduced to zero flow prior to rotation of the rotor 120. Under this reduced, e.g., zero, flow condition, the control electronics 160 signals the linear actuator 144 to move the microfluidic device 110 away from the rotor 120, thereby releasing the sealing force at the interface. The control electronics 160 then instructs the rotor driver 130 to rotate the rotor 120 to the INJECT position, at the reduced sealing force. In some implementations, the sealing force is reduced to 0 psi to 5000 psi prior to and during rotation of the rotor 120.

Once the rotor 120 has been rotated to the INJECT position, the control electronics 160 signals the linear actuator 144 to resume the sealing force and to reestablish the seal between the rotor 120 and the microfluidic device 110. The control electronics 160 then signals the pump 174 to resume the flow of mobile phase, into the microfluidic device 110. The mobile phase merges with the sample in the channel 118 and carries the sample away towards the analytical channel 119 for chromatographic separation. After the separation is done, the effluent exits the microfluidic device 110 and flows, e.g., to a detector for further analysis.

Over again, before the rotor 120 is switched back to the LOAD position, the control electronics 160, communicating with the flow sensor 176, signals the pump 174 to reduce or stop any active flow of the mobile phase. Under this reduced, e.g., zero, flow condition, the control electronics 160 commands the linear actuator 144 to move the microfluidic device 110 away from the rotor 120, thereby reducing or completely releasing the sealing force at the interface. The control electronics 160 then instructs the rotor driver 130 to rotate the rotor 120 to the LOAD position, at the reduced sealing force. After the rotor 120 has been switched back to the LOAD position, the control electronics 160 wields the linear actuator 144 to resume the sealing force and to reestablish the seal between the rotor 120 and the microfluidic device 110. The control electronics 160 then signals the pump 174 to resume the flow.

Other Implementations

Figure 8:
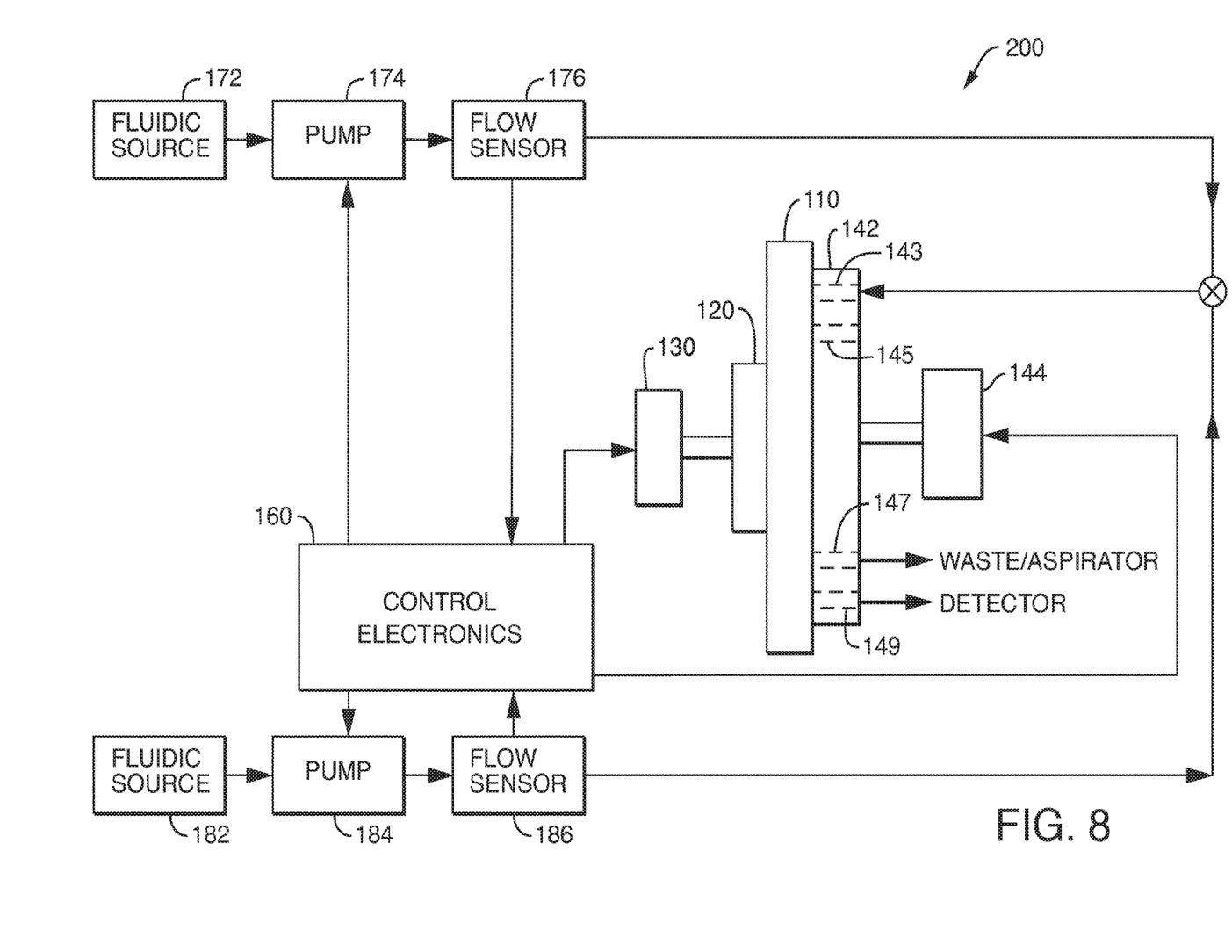
FIG. 8 is a schematic view of a system, including two flow-control sub-systems.

Although a few implementations have been described in detail above, other modifications are possible. For example, while a system incorporating a single mobile phase delivery line (e.g., a single pump or BSM) for isocratic separation has been described, in some implementations, more than one mobile phase delivery line (e.g., two pumps or BSMs) can be utilized, e.g., for gradient separation. An exemplary use of two pumps is illustrated in FIG. 8. A chromatography system 200 includes an additional mobile phase delivery line which includes a fluid source 182, a pump 184, and a flow sensor 186. A mixer or mixing tee 190 is placed downstream of the pumps 174 and 184 to mix solvents from pumps 174, 184 to form a mobile phase of a desired composition. Again, the system 200 can run at a high fluid pressure, and the sealing force providing the fluid tight seal between the rotor 120 and the microfluidic device 110 can be lowered, e.g., to zero, before rotor 120 is to be repositioned. Also, to avoid leakage and compositional disturbances, the mobile-phase flow can be reduced or completely stopped, prior to and during rotation of the rotor 120, to reduce the sealing force at the interface. Once the rotor 120 has been repositioned by the rotor driver 130, resumption of the flow and sealing force can be established through the pumps 174 and 184, wired to the flow sensors 176 and 186, respectively.

In some implementations, the chromatography system 100 or 200 is a high performance liquid chromatography (HPLC) system or an ultra-high performance liquid chromatography system.

Figure 9:
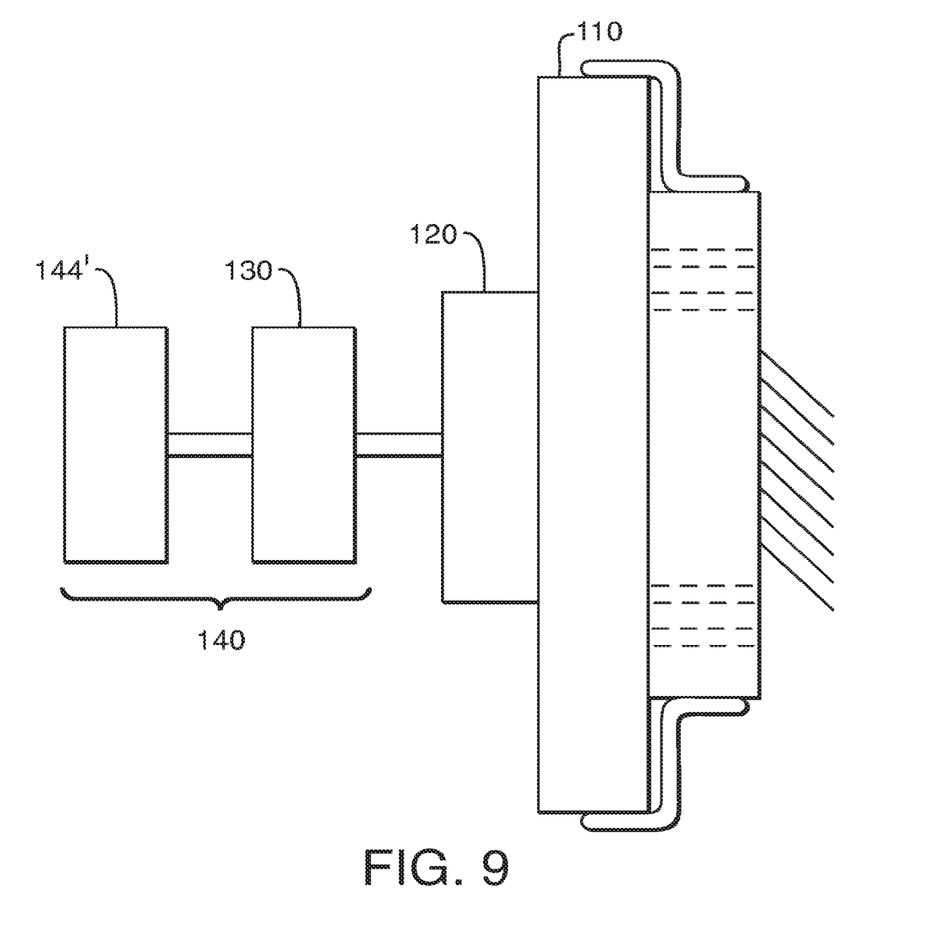
FIG. 9 is a side view of the clamping mechanism, attached to the rotor driver of FIG. 1.

Though the linear actuator 144, as illustrated in FIG. 1, is attached to the fluidic manifold 142, on an opposite side of microfluidic device as the rotor 120, it can as well be attached to the rotor driver 130, as shown in FIG. 9. In this case, the control electronics 160 can be configured to control the linear actuator 144', which, in turn, controls the rotor 120, to affect the linear movement of the rotor 120, relative to the microfluidic device 110. Such control can help to ensure that, prior to and during rotation of the rotor 120, the rotor 120 is displaced, via the linear actuator 144', away from the surface of the microfluidic device 110 and, consequently, the sealing force at the interface is reduced or completely relieved. After the rotor 120 has been rotationally repositioned (via the rotor driver 130), the control electronics 160 commands the clamping mechanism 140, which, in this case may consist essentially of the linear actuator 144', to resume the sealing force and to reestablish the fluid-tight seal at the interface. Again, in such an implementation, the linear actuator 144' can be a mechanical (e.g., piston, cam, etc.), electric, magnetic, hydraulic, or pneumatic actuator, or any combination thereof.

Alternatively, in some implementations, a dual motion actuator (i.e., a single actuator that provides independent linear and rotary motion) can be employed to control not only the rotary motion of the rotor relative to the microfluidic device, but also linear displacement of the rotor to force the rotor into contact with the microfluidic device thereby forming a fluid tight seal therebetween. Accordingly, a dual motion actuator can be employed to perform the functions of both the rotor driver and the clamping mechanism. Dual motion actuators are available from Haydon Kerk Motion Solutions, Inc., Waterbury, Conn.

In some implementations, two or more linear actuators can be used, with at least one attached to each side of the interface, e.g., one to the fluidic manifold 142 and one to the rotor driver 130, to wield the linear motion of the rotor 120 and the microfluidic device 110, thereby relieving the sealing force at the interface and reducing the wear and shedding altogether.

While an implementation has been described in which the fluidic connections between the microfluidic device 110 and external fluidic components, e.g., mobile-phase or sample sources, etc., are made through the channels defined by the fluidic manifold 142, in some implementations the fluidic connections can be made from the opposite side of the microfluidic device 110, e.g., through the rotor 120, in which case, the rotor 120 can have a plurality of fluidic passageways extending through the rotor 120 and overlapping with the grooves 121-123 to permit tubing connections of the microfluidic device 110 to the external fluidic components.

Alternatively or additionally, fluidic connections between external fluidic components and the microfluidic device may be made directly to the microfluidic device, such as by fluidic tubing connections at the surface of the microfluidic device. In such cases, the fluidic manifold may be replaced with a plate of similar construction but without fluidic channels, or the linear actuator may be configured to act directly on the microfluidic device.

While implementations have been described in which the microfluidic device is supported by the clamping mechanism, in some implementations the microfluidic device may be supported by some other system feature. For example, the microfluidic device may be supported by or suspended from a system chassis.

Moreover, though the system depicted in FIG. 8 employs a high-pressure mixing technique, where solvents are mixed on the high-pressure side of the solvent delivery pumps 174 and 184, a low-pressure mixing technique can as well applied to a system involving the rotor and microfluidic device, interfacing with each other.

Figure 10:
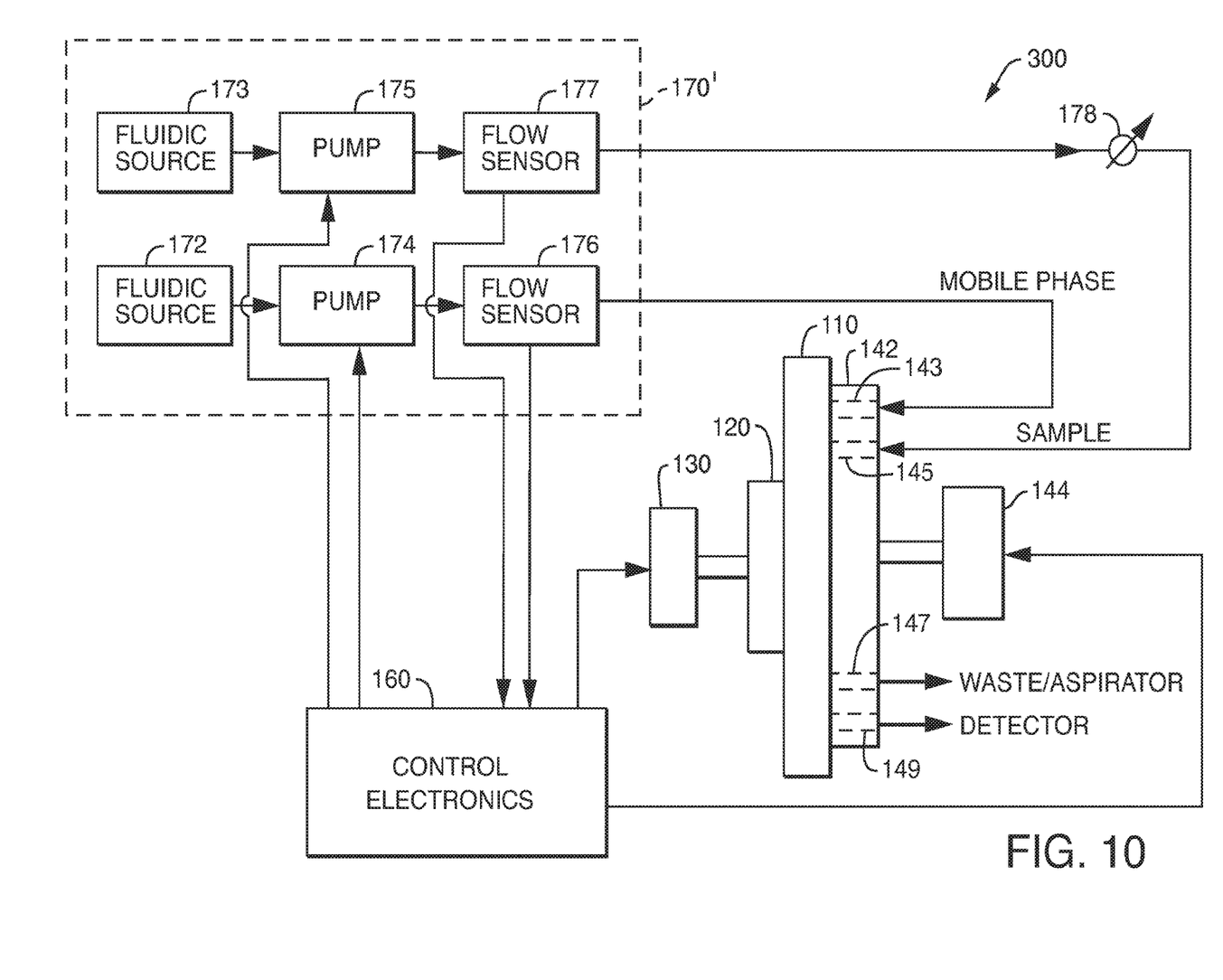
FIG. 10 is a schematic view of a system in which a trap column is incorporated into a microfluidic device.

While implementations have been described in which a microfluidic device includes a channel that serves as a sample loop, in some cases, the microfluidic device may, alternatively or additionally, include a channel that serves as a trap column. For example, in the microfluidic device 110 illustrated in FIG. 2, the first channel 118 may alternatively serve as a trap column. In this regard, the first channel can be packed with hydrophobic or other media, wherein a sample of interest can be maintained. FIG. 10 illustrates a system 300 that utilizes the microfluidic device 110 with such an arrangement (i.e., including a channel that serves as a trap column).

In the system 300 of FIG. 10, the flow control sub-system 170' includes an additional fluid delivery line. The additional fluid delivery line includes a fluid source 173 for supplying fluid, e.g., a solvent or a solvent mixture, which carries a sample injected from a sample injection valve 178 into the chromatographic sub-system 150 and serves as well as a wash reagent to clean up the sample; a pump 175, e.g., a nano pump, in fluid communication with the fluid source 173, for pumping the fluid to the chromatographic sub-system 150; and a flow sensor 177 operatively coupled to the pump 175, for sensing the flow rate of the fluid from the pump 175 and sending signals to the control electronics 160.

In use, the microfluidic device 110 is positioned between the fluidic manifold 142 of the clamping mechanism 140 and the rotor 120, as shown in FIG. 10. The microfluidic device 110 is then urged into fluid tight contact with the rotor 120. More specifically, the control electronics 160 drive the linear actuator 144 which displaces the fluidic manifold 142, which, in turn, pushes the microfluidic device 110 into fluid tight contact with the rotor 120.

Initially, the rotor 120 is in the LOAD position, relative to the microfluidic device 110. A solvent (e.g., a pure solvent or a mixture) supplied by the fluid source 173 and driven by the pump 175, flows towards the microfluidic device 110. The flowing solvent merges a sample introduced by the sample injection valve 178 and carries the sample into the microfluidic device 110 through the passageway 145. The sample is trapped in the trap channel 118 (FIG. 2), defined by the microfluidic device 110, while unwanted materials in the fluid are washed away from the microfluidic device 110 to waste by way of the passageway 147.

Before the rotor 120 is switched to the INJECT position, the control electronics 160, in signal communication with the flow sensor 177, controls the pump 175 to reduce or stop the flowing solvent. In some cases, the flow can be reduced to zero flow prior to rotation of the rotor 120. Under this reduced, e.g., zero, flow condition, the control electronics 160 signals the linear actuator 144 to move the microfluidic device 110 away from the rotor 120, thereby releasing the sealing force at the interface. The control electronics 160 then instructs the rotor driver 130 to rotate the rotor 120 to the INJECT position, at the reduced sealing force. In some implementations, the sealing force is reduced to 0 psi to 5000 psi prior to and during rotation of the rotor 120.

Once the rotor 120 has been rotated to the INJECT position, the control electronics 160 signals the linear actuator 144 to resume the sealing force and to reestablish the seal between the rotor 120 and the microfluidic device 110. The control electronics 160 then optionally signals the pump 175 to resume the flow, which is directed to waste through the passageway 147.

When the rotor is in INJECT position. A mobile phase, either a pure solvent or a mixture, supplied by the fluid source 172, is pumped by the pump 174 into the microfluidic device 110. The mobile phase merges with the sample trapped in the trap channel 118 and carries the sample away towards the analytical channel 119 for chromatographic separation. After the separation is done, the effluent exits the microfluidic device 110 and flows, e.g., to a detector for further analysis.

Over again, before the rotor 120 is switched back to the LOAD position, the control electronics 160, communicating with the flow sensor 176, signals the pump 174 to reduce or stop any active flow of the mobile phase. Under this reduced, e.g., zero, flow condition, the control electronics 160 commands the linear actuator 144 to move the microfluidic device 110 away from the rotor 120, thereby reducing or completely releasing the sealing force at the interface. The control electronics 160 then instructs the rotor driver 130 to rotate the rotor 120 to the LOAD position, at the reduced sealing force. After the rotor 120 has been switched back to the LOAD position, the control electronics 160 wields the linear actuator 144 to resume the sealing force and to reestablish the seal between the rotor 120 and the microfluidic device 110. The control electronics 160 then signals the pump 175 to resume the flow.

Accordingly, other implementations are within the scope of the following claims.

What is claimed is:

1. A method comprising:
   establishing a fluidic connection with a fluid tight seal between a rotor and a microfluidic device of a chromatography system;
   reducing fluid flow between the rotor and the microfluidic device;
   after the reducing fluid flow, reducing a sealing force between the rotor and the microfluidic device;
   rotating the rotor relative to the microfluidic device, at the reduced sealing force, to change a fluid pathway between the rotor and the microfluidic device;
   after the rotating, reestablishing the sealing force to produce a fluid tight seal between the rotor and the microfluidic device; and
   after the reestablishing the sealing force, reestablishing the fluid flow between the rotor and the microfluidic device.

2. The method of claim 1, further comprising coordinating the steps of reducing the fluid flow and reducing the sealing force between the rotor and the microfluidic device.

3. The method of claim 1, wherein reducing fluid flow comprises reducing the flow to zero flow.

4. A method for controlling a chromatography system to prevent at least one of wear, particulate formation, leakage, and composition disturbance associated with an interface between a rotor and a microfluidic device, the method comprising:
   driving a linear actuator to push the microfluidic device into fluid tight contact with the rotor to create a sealing force at the interface between the rotor and the microfluidic device to prevent at least one of wear, particulate formation, leakage, and composition disturbance associated with the interface between the rotor and the microfluidic device;
   delivering a mobile phase into the microfluidic device;
   reducing flow of the mobile phase into the microfluidic device via a pump;

after the reducing flow, releasing the sealing force at the interface between the rotor and the microfluidic device via the linear actuator;

reducing particle shedding during rotation of the rotor by rotating the rotor relative to the microfluidic device while the sealing force is released;

after the rotating, reestablishing the sealing force at the interface between the rotor and the microfluidic device via the linear actuator to prevent at least one of wear, particulate formation, leakage, and composition disturbance associated with the interface between the rotor and the microfluidic device; and after the reestablishing, resuming flow of the mobile phase into the microfluidic device via the pump wherein the mobile phase merges with a sample in the microfluidic device.

5. The method of claim 4, further comprising:
injecting a sample into a channel of the microfluidic device.

6. The method of claim 4, further comprising:
aspirating a sample into the microfluidic device.

7. The method of claim 4, wherein the sealing force is reduced during rotation of the rotor relative to the microfluidic device.

8. The method of claim 4, wherein control electronics in signal communication with a rotor driver and the linear actuator control the driving of the linear actuator and the rotation of the rotor relative to the microfluidic device.

9. The method of claim 4, wherein driving the linear actuator to push the microfluidic device into fluid tight contact with the rotor to create the sealing force at the interface between the rotor and the microfluidic device comprises displacing a fluidic manifold to push the microfluidic device into fluid tight contact with the rotor wherein the microfluidic device is positioned between the fluidic manifold and the rotor.

10. The method of claim 4, wherein reducing flow of the mobile phase into the microfluidic device via the pump comprises reducing the flow to zero flow.

11. The method of claim 4, wherein the rotor comprises a polymeric material, wherein the polymeric material defines a surface facing the microfluidic device.

12. The method of claim 11, wherein the polymeric material comprises polyetheretherketone, polyimide, or mixtures thereof.

13. The method of claim 11, wherein the surface is an unpolished surface.

14. The method of claim 4, wherein the linear actuator is coupled with the rotor.

15. The method of claim 4, wherein the linear actuator is a mechanical, electric, magnetic, hydraulic, or pneumatic actuator, or any combination thereof.

16. The method of claim 15, wherein the electric actuator is a piezoelectric actuator.

17. The method of claim 4, wherein the sealing force established by the linear actuator is fluid tight up to about 30,000 psi or higher.

18. The method of claim 4, wherein the sealing force is reduced to a lower level of 0 psi to 5000 psi prior to rotation of the rotor and maintained at the lower level during rotation of the rotor.

19. A method for controlling a rotor and a microfluidic device of a chromatography system, the method comprising:

driving a linear actuator to push the microfluidic device into fluid tight contact with the rotor to create a sealing force at the interface between the rotor and the microfluidic device; and reducing particle shedding during rotation of the rotor by reducing the sealing force during rotation of the rotor relative to the microfluidic device, wherein rotation of the rotor relative to the microfluidic device changes a fluid pathway between the rotor and the microfluidic device.

20. The method of claim 19, further comprising:

reestablishing the sealing force at the interface between the rotor and the microfluidic device via the linear actuator to prevent at least one of wear, particulate formation, leakage, and composition disturbance associated with the interface between a rotor and a microfluidic device.

* * * * *